US012519227B2

(12) United States Patent
Lin et al.

(10) Patent No.: US 12,519,227 B2
(45) Date of Patent: Jan. 6, 2026

(54) RECONFIGURABLE REFLECTARRAY STRUCTURE AND CONTROL CIRCUIT HAVING RECONFIGURABLE REFLECTARRAY STRUCTURE

(71) Applicant: NATIONAL CHUNG CHENG UNIVERSITY, Chiayi (TW)

(72) Inventors: Shih-Cheng Lin, Taitung County (TW); Sheng-Fuh Chang, Chiayi County (TW); Chia-Chan Chang, Chiayi (TW); Yuan-Chun Lin, Hsinchu County (TW); Ting-Hao Shin, Tainan (TW)

(73) Assignee: NATIONAL CHUNG CHENG UNIVERSITY, Chiayi (TW)

( * ) Notice: Subject to any disclaimer, the term of this patent is extended or adjusted under 35 U.S.C. 154(b) by 163 days.

(21) Appl. No.: 18/429,446

(22) Filed: Feb. 1, 2024

(65) Prior Publication Data

US 2025/0055188 A1 Feb. 13, 2025

(30) Foreign Application Priority Data

Aug. 8, 2023 (TW) ................................ 112129846

(51) Int. Cl.
*H01Q 15/00* (2006.01)
*H01Q 3/46* (2006.01)

(52) U.S. Cl.
CPC .................................... *H01Q 3/46* (2013.01)

(58) Field of Classification Search
CPC ............................ H01Q 1/241; H01Q 15/002
See application file for complete search history.

(56) References Cited

U.S. PATENT DOCUMENTS

| | | | | | |
|---|---|---|---|---|---|
| 4,777,490 | A * | 10/1988 | Sharma | H01Q 21/0093 343/754 |
| 8,339,328 | B2 * | 12/2012 | Narasimhan | H01Q 9/42 343/702 |
| 10,135,119 | B2 * | 11/2018 | Ku | H01Q 9/065 |
| 10,840,610 | B2 * | 11/2020 | Hsieh | H01Q 15/14 |
| 2009/0066584 | A1 * | 3/2009 | Thornell-Pers | H01Q 5/321 343/702 |
| 2018/0219616 | A1 * | 8/2018 | Nordgran | H04B 7/15507 |
| 2019/0081618 | A1 * | 3/2019 | Liu | H01Q 15/14 |

(Continued)

FOREIGN PATENT DOCUMENTS

| | | | |
|---|---|---|---|
| TW | 201742316 | A | 12/2017 |
| TW | 201810802 | A | 3/2018 |

(Continued)

*Primary Examiner* — Awat M Salih
(74) *Attorney, Agent, or Firm* — CKC & Partners Co., LLC

(57) ABSTRACT

A Reconfigurable ReflectArray (RRA) structure includes a P-Intrinsic-N (P-I-N) diode and a metal circuit. The metal circuit includes a first metal member and a second metal member. The first metal member is coupled to one end of the P-I-N diode. The second metal member is coupled to another end of the P-I-N diode. One of the first metal member and the second metal member includes a first radiating portion and a second radiating portion. The first radiating portion is located between the P-I-N diode and the second radiating portion. The first radiating portion has a first length. The second radiating portion has a second length. The first length is different from the second length.

18 Claims, 10 Drawing Sheets

(56) References Cited

U.S. PATENT DOCUMENTS

2020/0136263 A1* 4/2020 Lee ........................ G01S 13/755
2020/0161754 A1* 5/2020 Cho ........................ H01Q 3/247
2024/0235619 A9* 7/2024 Kumagai ............... H01Q 5/378

FOREIGN PATENT DOCUMENTS

TW 201935767 A 9/2019
WO 2023/282299 A1 1/2023

* cited by examiner

RECONFIGURABLE REFLECTARRAY STRUCTURE AND CONTROL CIRCUIT HAVING RECONFIGURABLE REFLECTARRAY STRUCTURE

RELATED APPLICATIONS

This application claims priority to Taiwan Application Serial Number 112129846, filed Aug. 8, 2023, which is herein incorporated by reference.

BACKGROUND

Technical Field

The present disclosure relates to a reflectarray structure and a control circuit having the reflectarray structure. More particularly, the present disclosure relates to a reconfigurable reflectarray structure and a control circuit having the reconfigurable reflectarray structure.

Description of Related Art

In the fifth generation (5G) mobile communication applications, the spectrum and space utilization efficiency of radio waves become important issues. Millimeter waves will become a necessary development, especially in terms of frequency. In the conventional technology, the method of increasing the number of base stations or boosters is mostly adopted for dead spots, dark areas or weak signal areas of the radio waves. Compared with the frequency bands used in current wireless communications, the propagation distance and the influence range of electromagnetic waves may be significantly reduced. For example, when comparing 28 GHz and 2.4 GHz, the propagation distance will be reduced by more than 10 times under the same signal strength, and the influence range will be reduced by more than 100 times.

In recent years, a multi-antenna system is a hot topic of current research. The multi-antenna system may increase the number of antennas to 10 or even 100-1000, so that issues, such as development, setup, integration and measurement, on circuits and antennas of the millimeter waves are very important. However, although the development of the millimeter waves is certainly important, if it relies entirely on adopting the base stations or the boosters, it will become a huge cost and manpower-intensive project due to the huge number of the base stations or the boosters, not to mention subsequent maintenance projects. Therefore, a reconfigurable reflectarray structure and a control circuit having the reconfigurable reflectarray structure with simple, lightweight, low-cost, low-power consumption and easy-to-control configurations are commercially desirable.

SUMMARY

According to one aspect of the present disclosure, a Reconfigurable ReflectArray (RRA) structure includes a P-Intrinsic-N (P-I-N) diode and a metal circuit. The metal circuit includes a first metal member and a second metal member. The first metal member is coupled to one end of the P-I-N diode. The second metal member is coupled to another end of the P-I-N diode. One of the first metal member and the second metal member includes a first radiating portion and a second radiating portion. The first radiating portion is located between the P-I-N diode and the second radiating portion. The first radiating portion has a first length. The second radiating portion has a second length. The first length is different from the second length.

According to another aspect of the present disclosure, a Reconfigurable ReflectArray (RRA) structure includes a P-Intrinsic-N (P-I-N) diode and a metal circuit. The metal circuit includes a first metal member and a second metal member. The first metal member is electrically connected to one end of the P-I-N diode. The second metal member is electrically connected to another end of the P-I-N diode. One of the first metal member and the second metal member includes a first radiating portion and a second radiating portion. The first radiating portion is located between the P-I-N diode and the second radiating portion. The first radiating portion has a first length and an annular shape. The second radiating portion has a second length. The first length is different from the second length.

According to further another aspect of the present disclosure, a control circuit having a Reconfigurable ReflectArray (RRA) structure includes the RRA structure and a control unit. The RRA structure includes a P-Intrinsic-N (P-I-N) diode and a metal circuit. The metal circuit includes a first metal member and a second metal member. The first metal member is coupled to one end of the P-I-N diode. The second metal member is coupled to another end of the P-I-N diode. One of the first metal member and the second metal member includes a first radiating portion and a second radiating portion. The first radiating portion is located between the P-I-N diode and the second radiating portion. The first radiating portion has a first length. The second radiating portion has a second length. The first length is different from the second length. The control unit is connected to the RRA structure and configured to control a conduction of the P-I-N diode.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details are unnecessary. In addition, for simplifying the drawings, some conventional structures and elements will be simply illustrated, and repeated elements may be represented by the same labels.

It will be understood that when an element (or unit, circuit) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
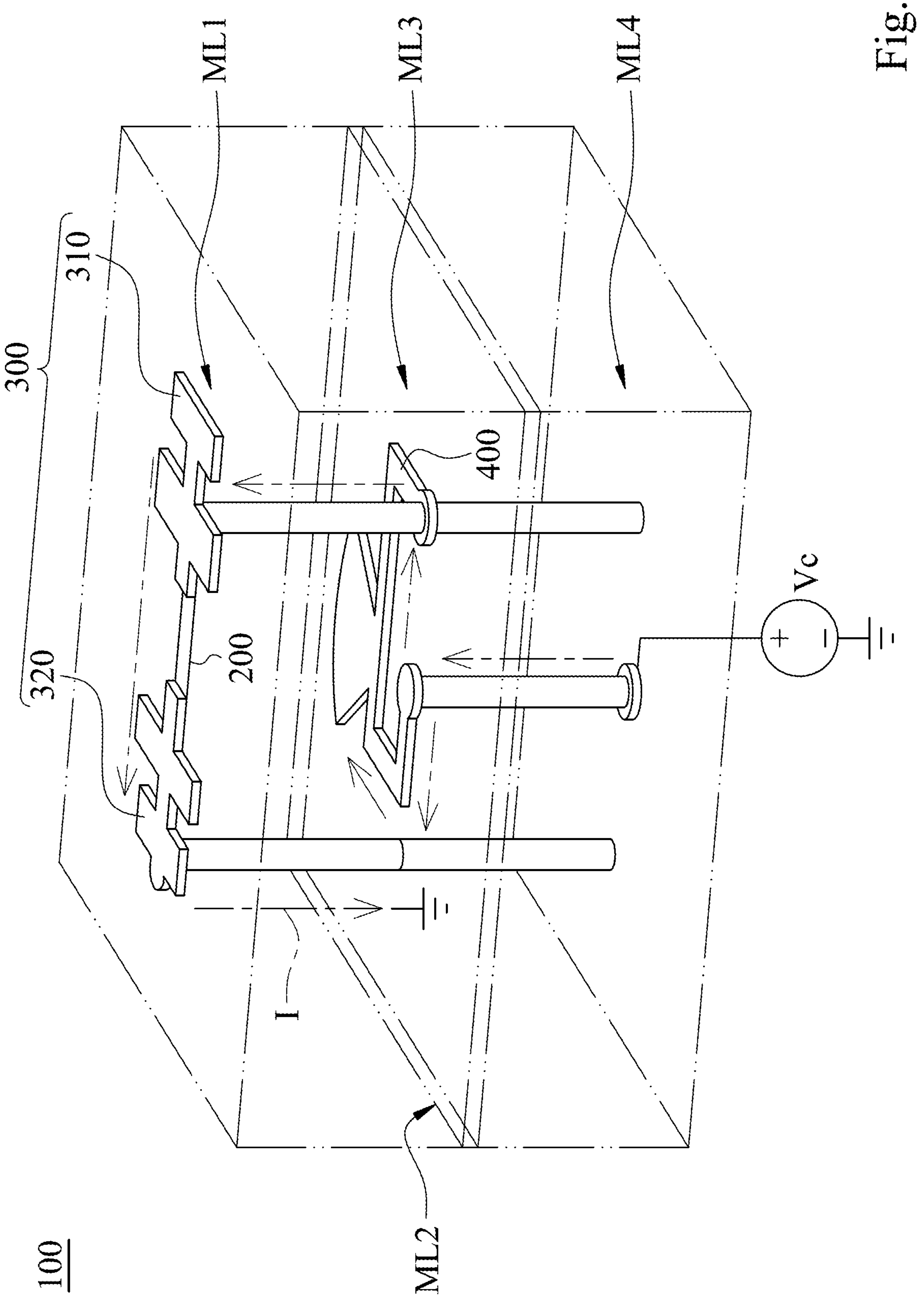
FIG. 1 shows a schematic view of a Reconfigurable ReflectArray (RRA) structure according to a first embodiment of the present disclosure.

Reference is made to FIG. 1. FIG. 1 shows a schematic view of a Reconfigurable ReflectArray (RRA) structure 100 according to a first embodiment of the present disclosure. The RRA structure 100 is formed by superimposing multiple layers which includes a radiating layer ML1, a ground layer ML2, a radio frequency suppression layer ML3 and a Direct Current (DC) bias layer ML4. The radiating layer ML1 includes a P-Intrinsic-N (P-I-N) diode 200 and a metal circuit 300. The P-I-N diode 200 and the metal circuit 300 are connected to each other. The metal circuit 300 includes a first metal member 310 and a second metal member 320. The first metal member 310 is coupled to one end of the P-I-N diode 200. The second metal member 320 is coupled to another end of the P-I-N diode 200. The ground layer ML2 is connected to a ground voltage (GND). The radio frequency suppression layer ML3 includes a radio frequency choke 400. The radio frequency choke 400 is configured to suppress high frequency signals. The DC bias layer ML4 can be a fiberglass substrate (FR4). A supply voltage Vc is transmitted to the P-I-N diode 200 and the metal circuit 300 through the radio frequency choke 400 to generate a direct current I, thereby enabling the RRA structure 100 to be operated normally for the 5G application operating at n257 frequency band (26.5 GHz to 29.5 GHz). In addition, the multiple layer structure is formed by the radiating layer ML1, the ground layer ML2, the radio frequency suppression layer ML3 and the DC bias layer ML4 from top to bottom. Therefore, the RRA structure 100 of the present disclosure has characteristics of broadband and wide scanning range with a simple structure, low cost and low loss, thus being quite suitable for wireless mobile communications.

Figure 2:
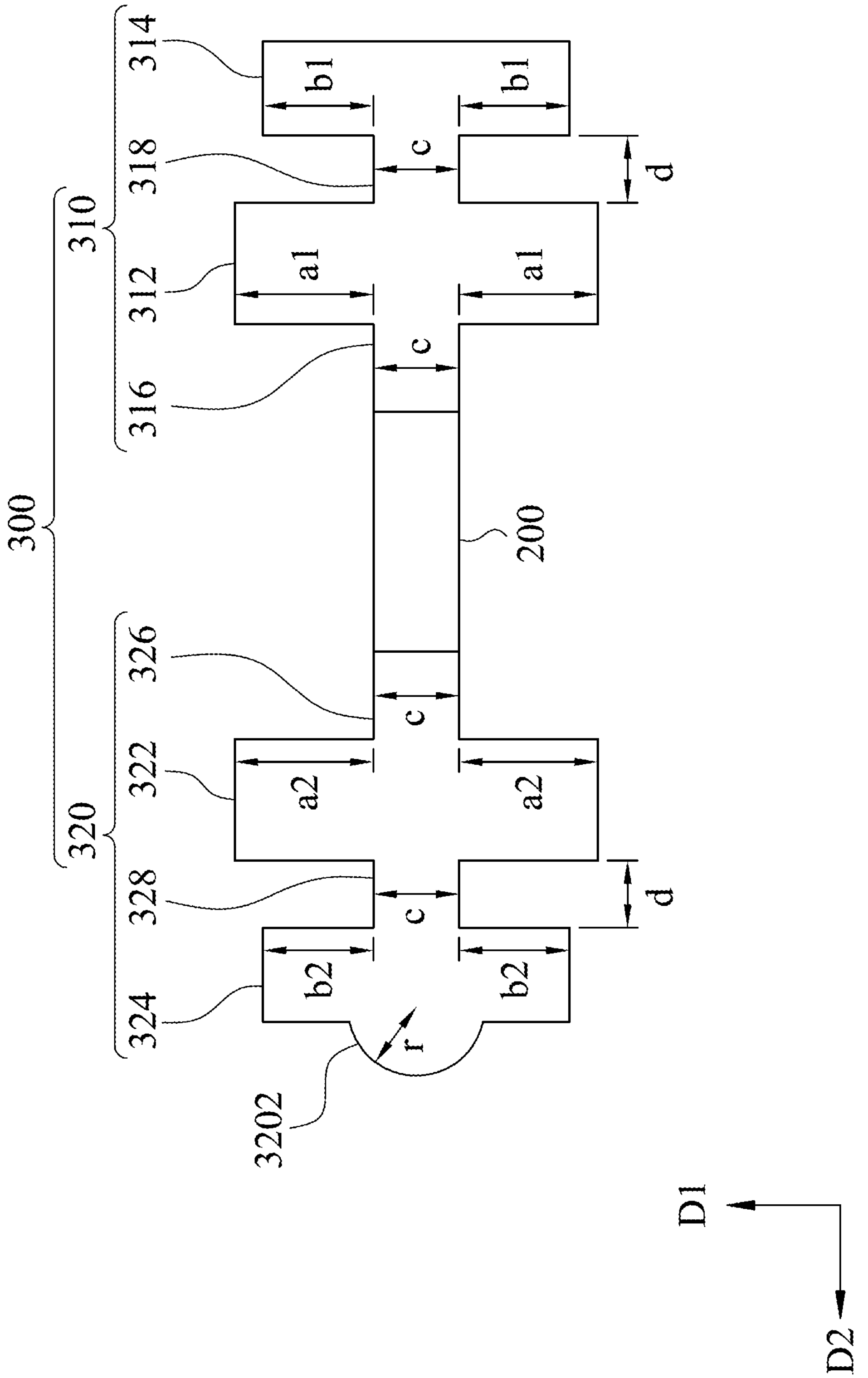
FIG. 2 shows a schematic view of a P-Intrinsic-N (P-I-N) diode and a metal circuit of the RRA structure of FIG. 1.
Figure 3:
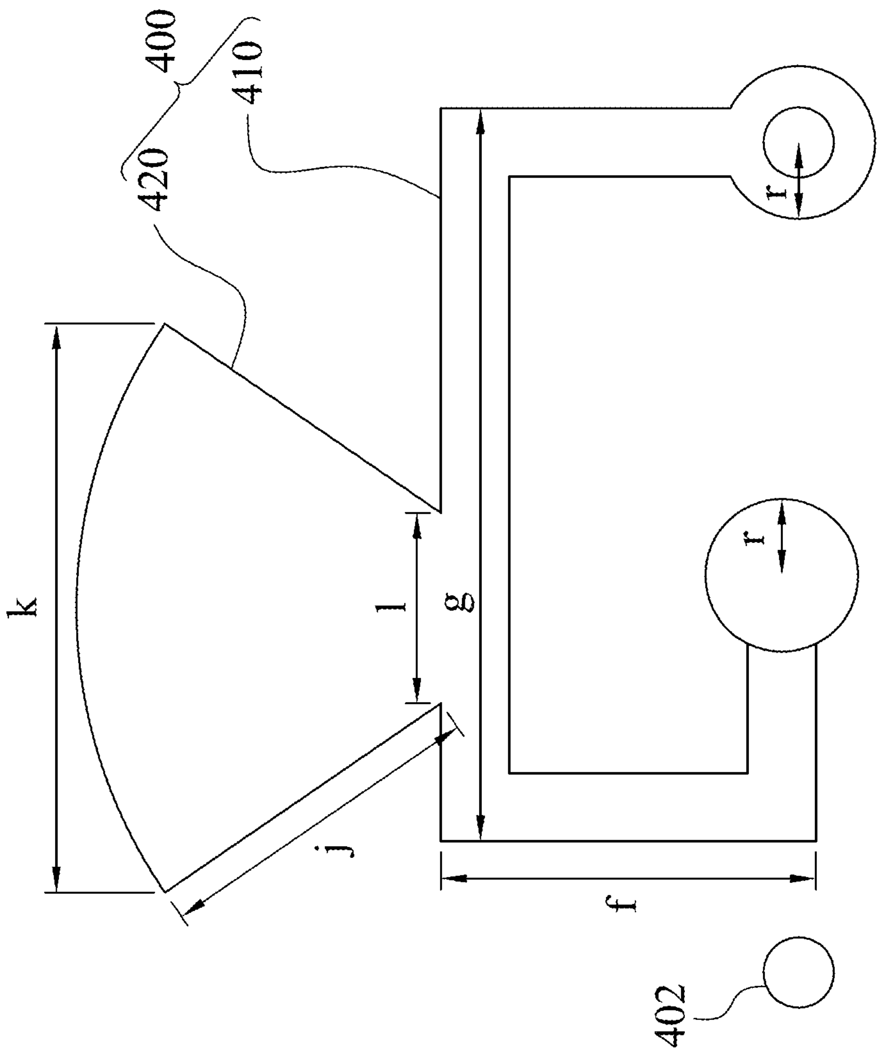
FIG. 3 shows a schematic view of a radio frequency choke of the RRA structure of FIG. 1.

Reference is made to FIGS. 1, 2 and 3. FIG. 2 shows a schematic view of a P-I-N diode 200 and a metal circuit 300 of the RRA structure 100 of FIG. 1. FIG. 3 shows a schematic view of a radio frequency choke 400 of the RRA structure 100 of FIG. 1. The metal circuit 300 corresponds vertically to the radio frequency choke 400, and the first metal member 310 of the metal circuit 300 is electrically connected to the radio frequency choke 400.

The first metal member 310 of the metal circuit 300 (one of the first metal member 310 and the second metal member 320) includes a first radiating portion 312, a second radiating portion 314, a first connecting portion 316 and a second connecting portion 318. The first radiating portion 312 is located between the P-I-N diode 200 and the second radiating portion 314. The first radiating portion 312 has a first length a1. The first length a1 is a partial length along a longitudinal direction D1 of the first radiating portion 312. A total length along the longitudinal direction D1 of the first radiating portion 312 is equal to two times the first length a1 plus a width c of the first connecting portion 316 (i.e., the total length of the first radiating portion 312 is 2×a1+c). In addition, the second radiating portion 314 has a second length b1, and the first length a1 is different from the second length b1. The second length b1 is a partial length along the longitudinal direction D1 of the second radiating portion 314. A total length along the longitudinal direction D1 of the second radiating portion 314 is equal to two times the second length b1 plus the width c of the second connecting portion 318 (i.e., the total length of the second radiating portion 314 is 2×b1+c). In this embodiment, the first length a1 is greater than the second length b1. The total length of the first radiating portion 312 is also greater than the total length of the second radiating portion 314. Furthermore, the first connecting portion 316 is connected between the P-I-N diode 200 and the first radiating portion 312, and has the width c. The second connecting portion 318 is connected between the first radiating portion 312 and the second radiating portion 314, and has the width c and a length d. The first connecting portion 316, the second connecting portion 318 and the P-I-N diode 200 have the same width.

The second metal member 320 of the metal circuit 300 (another of the first metal member 310 and the second metal member 320) includes a third radiating portion 322, a fourth radiating portion 324, a third connecting portion 326 and a fourth connecting portion 328. The third radiating portion 322 is located between the P-I-N diode 200 and the fourth radiating portion 324. The third radiating portion 322 has a third length a2. The third length a2 is a partial length along the longitudinal direction D1 of the third radiating portion 322. A total length along the longitudinal direction D1 of the third radiating portion 322 is equal to two times the third length a2 plus a width c of the third connecting portion 326 (i.e., the total length of the third radiating portion 322 is 2×a2+c). In addition, the fourth radiating portion 324 has a fourth length b2, and the third length a2 is different from the fourth length b2. The fourth length b2 is a partial length along the longitudinal direction D1 of the fourth radiating portion 324. A total length along the longitudinal direction D1 of the fourth radiating portion 324 is equal to two times the fourth length b2 plus the width c of the fourth connecting portion 328 (i.e., the total length of the fourth radiating portion 324 is 2×b2+c). In this embodiment, the third length a2 of the third radiating portion 322 is equal to the first length a1 of the first radiating portion 312, and the fourth length b2 of the fourth radiating portion 324 is equal to the second length b1 of the second radiating portion 314. The third length a2 is greater than the fourth length b2. The total length of the third radiating portion 322 is also greater than the total length of the fourth radiating portion 324. The first metal member 310 and the second metal member 320 are located at two ends of the P-I-N diode 200, respectively, so that the first metal member 310 and the second metal member 320 both form low outside and high inside structures (i.e., short outside (the second radiating portion 314, the fourth radiating portion 324) and long inside (the first radiating portion 312, the third radiating portion 322) structures), and the P-I-N diode 200 is connected to the metal circuit 300 to form a dumbbell shape. Furthermore, the third connecting portion 326 is connected between the P-I-N diode 200 and the third radiating portion 322, and has the width c. The fourth connecting portion 328 is connected between the third radiating portion 322 and the fourth radiating portion 324, and has the width c and the length d. The third connecting portion 326, the fourth connecting portion 328 and the P-I-N diode 200 have the same width. It is worth mentioning that the fourth radiating portion 324 has a convex portion 3202 protruding in a latitudinal direction D2 away from the P-I-N diode 200, and the convex portion 3202 has a semicircular shape or an arch shape. In this embodiment, the convex portion 3202 has the arch shape. A center of a circle corresponding to the convex portion 3202 is located at the fourth radiating portion 324, and the circle corresponding to the convex portion 3202 has a radius r, but the present disclosure is not limited thereto.

The radio frequency choke 400 includes a line segment 410 and a radial stub 420. The line segment 410 corresponds to a quarter-wave line. The line segment 410 is connected to the radial stub 420. In addition, the radio frequency suppression layer ML3 further includes a ground metal member 402, and the ground metal member 402 corresponds to the second metal member 320 of the radiating layer ML1. The radio frequency choke 400 has a plurality of parameters which include the radius r, line lengths f, g, a side length j, a width k and a connecting distance l.

Table 1 lists values of parameters of this embodiment. The parameters include the first length a1, the second length b1, the third length a2, the fourth length b2, the width c, the length d, the radius r, the line lengths f, g, the side length j, the width k and the connecting distance l, but the present disclosure is not limited thereto.

TABLE 1

| Parameter | a1/a2 | b1/b2 | c | d | r |
|---|---|---|---|---|---|
| Value (mm) | 0.45 | 0.35 | 0.3 | 0.33 | 0.225 |
| Parameter | f | g | j | k | l |
| Value (mm) | 1.15 | 2.2 | 1 | 1.7 | 0.56 |

Therefore, the RRA structure 100 of the present disclosure utilizes the dumbbell shape of combination of the P-I-N diode 200 and the metal circuit 300 to enable the RRA structure 100 to have characteristics of broadband and wide scanning range with a simple structure, low cost and low loss, thus being quite suitable for wireless mobile communications.

Figure 4:
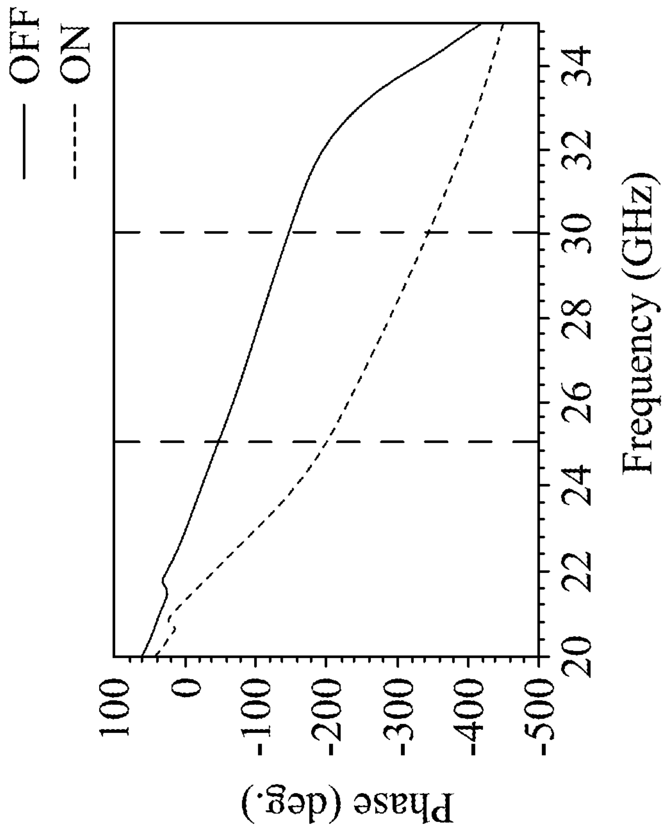
FIG. 4 shows a schematic view of a relationship between a phase and a frequency of the RRA structure of FIG. 1.
Figure 5:
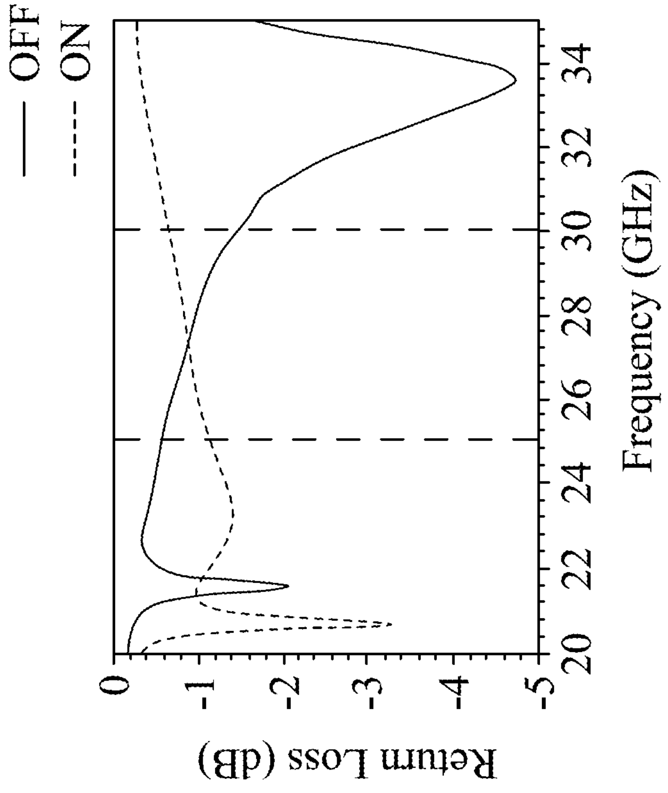
FIG. 5 shows a schematic view of a relationship between a return loss and the frequency of the RRA structure of FIG. 1.

Reference is made to FIGS. 1, 4 and 5. FIG. 4 shows a schematic view of a relationship between a phase and a frequency of the RRA structure 100 of FIG. 1. FIG. 5 shows a schematic view of a relationship between a return loss and the frequency of the RRA structure 100 of FIG. 1. “deg.” represents an angle of the phase. “ON” represents that the P-I-N diode 200 is operated in an on state, which can be regarded as a resistor. “OFF” represents that the P-I-N diode 200 is operated in an off state, which can be regarded as a capacitor. The bandwidth of the RRA structure 100 is 19%, covering 24.9 GHz to 30.1 GHz, meeting the specified bandwidth requirements. In addition, the simulation results show that the peak simulated gain of 1600-cell (40×40) RRA structures 100 is 29.4 dB while the achievable beam scanning range is from plus 60 degrees to minus 60 degrees. The RRA structure 100 of FIG. 1 can be regarded as a RRA unit cell, and multiple RRA unit cells can be combined into a one-dimensional array or a two-dimensional array. The size of the multiple RRA unit cells can be determined according to requirement.

Figure 6A:
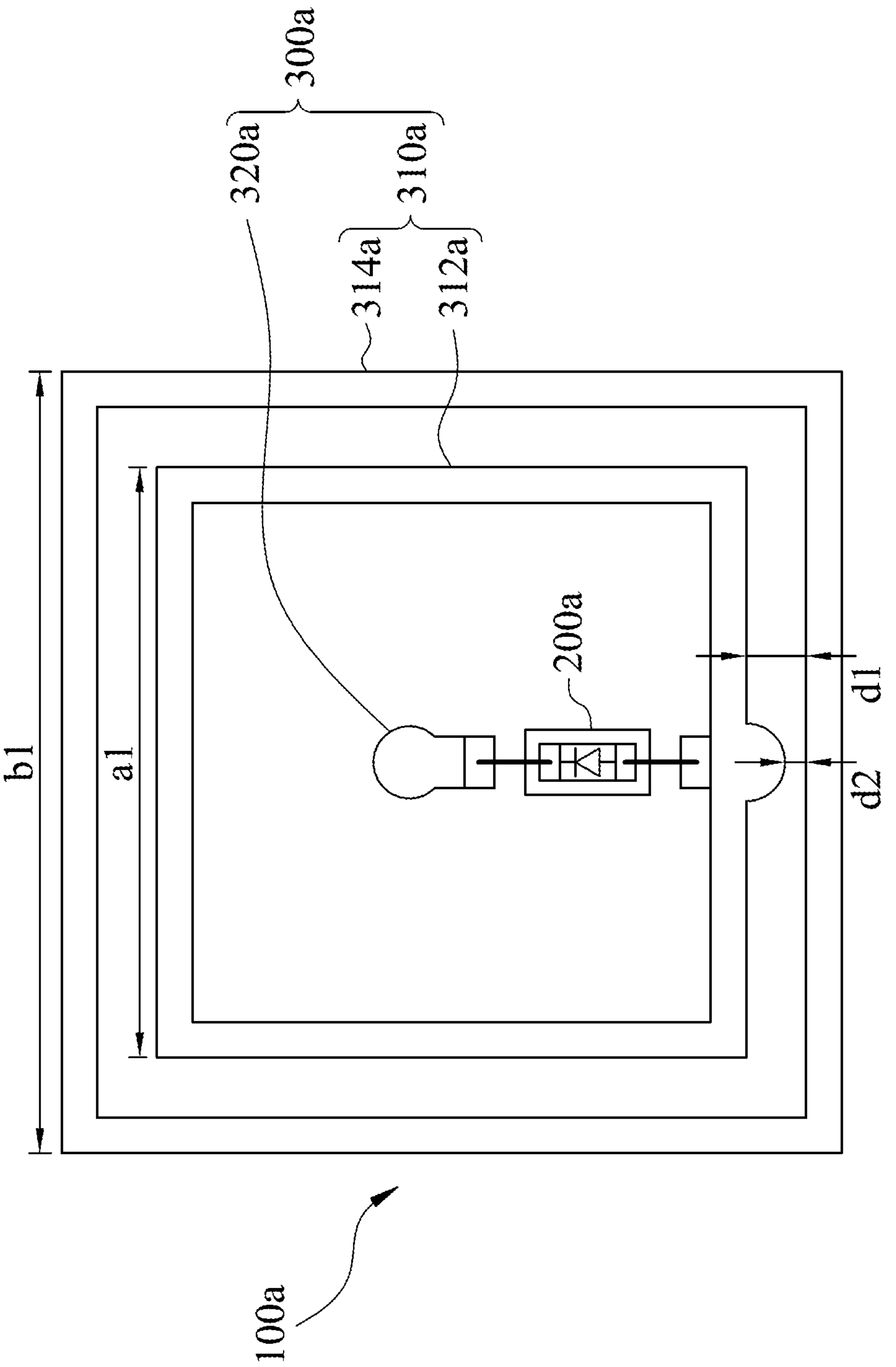
FIG. 6A shows a schematic view of a RRA structure according to a second embodiment of the present disclosure.
Figure 6B:
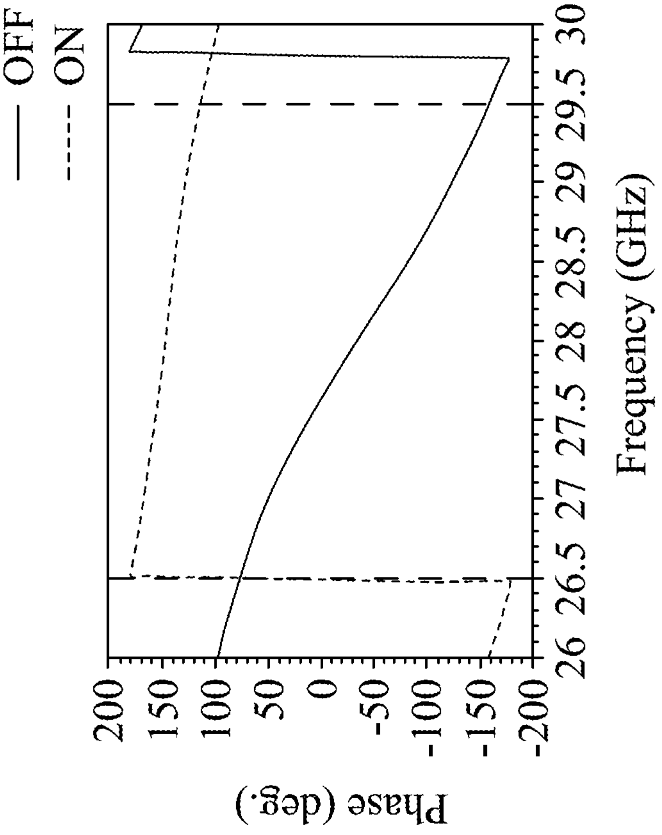
FIG. 6B shows a schematic view of a relationship between a phase and a frequency of the RRA structure of FIG. 6A.
Figure 6C:
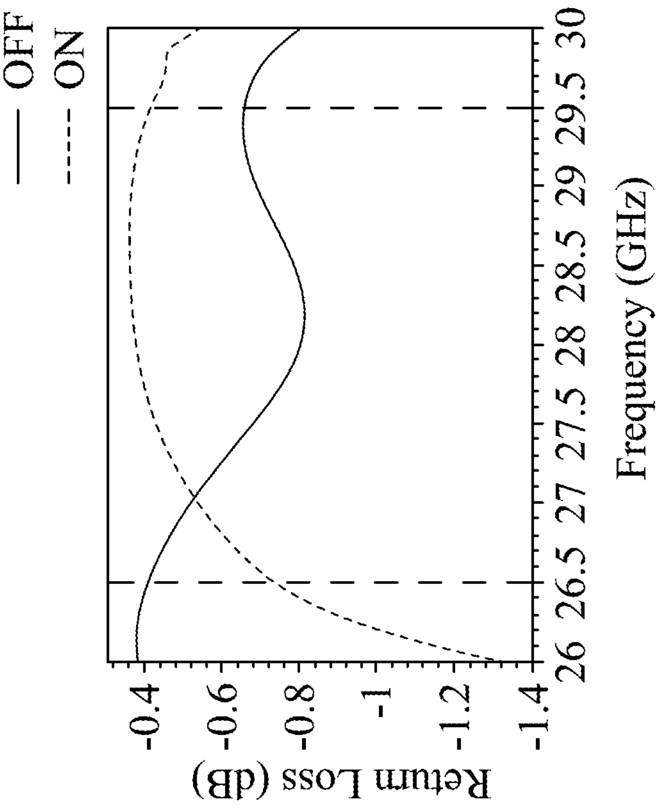
FIG. 6C shows a schematic view of a relationship between a return loss and the frequency of the RRA structure of FIG. 6A.

Reference is made to FIGS. 1, 6A, 6B and 6C. FIG. 6A shows a schematic view of a RRA structure 100*a* according to a second embodiment of the present disclosure (the radiating layer is only shown). FIG. 6B shows a schematic view of a relationship between a phase and a frequency of the RRA structure 100*a* of FIG. 6A. FIG. 6C shows a schematic view of a relationship between a return loss and the frequency of the RRA structure 100*a* of FIG. 6A. The RRA structure 100*a* includes a P-I-N diode 200*a* and a metal circuit 300*a*. The P-I-N diode 200*a* is the same as the P-I-N diode 200 of FIG. 1. The metal circuit 300*a* includes a first metal member 310*a* and a second metal member 320*a*. The first metal member 310*a* is electrically connected to one end of the P-I-N diode 200*a*. The second metal member 320*a* is electrically connected to another end of the P-I-N diode 200*a*. In this embodiment, the first metal member 310*a* and the second metal member 320*a* are electrically connected to the P-I-N diode 200*a* via wire bond, but the present disclosure is not limited thereto. The first metal member 310*a* (i.e., one of the first metal member 310*a* and the second metal member 320*a*) includes a first radiating portion 312*a* and a second radiating portion 314*a*. The first radiating portion 312*a* is located between the P-I-N diode 200*a* and the second radiating portion 314*a*. The first radiating portion 312*a* has a first length a1 and an annular shape. The second radiating portion 314*a* has a second length b1. The first length a1 is different from the second length b1.

In detail, the first length a1 is smaller than the second length b1. The second radiating portion 314*a* surrounds the first radiating portion 312*a* and has another annular shape. The first radiating portion 312*a* is separated from the second radiating portion 314*a* by at least one distance (e.g., the distance d1 and d2). The first radiating portion 312*a* surrounds the P-I-N diode 200*a*. In other words, the first radiating portion 312*a* surrounds the P-I-N diode 200*a* and the second metal member 320*a* (i.e., another of the first metal member 310*a* and the second metal member 320*a*). The first radiating portion 312*a* may have a square shape, a circular shape or an elliptical shape, and the second radiating portion 314*a* may have another square shape or a curve shape. In this embodiment, the first radiating portion 312*a* and the second radiating portion 314*a* have the square shape, and the total length of the first radiating portion 312*a* is smaller than the total length of the second radiating portion 314*a*. Therefore, the RRA structure 100*a* of the present disclosure utilizes a double ring shape of combination of the P-I-N diode 200*a* and the metal circuit 300*a* to enable the RRA structure 100*a* to have characteristics of broadband and wide scanning range with a simple structure, low cost and low loss, thus being quite suitable for wireless mobile communications.

Figure 7A:
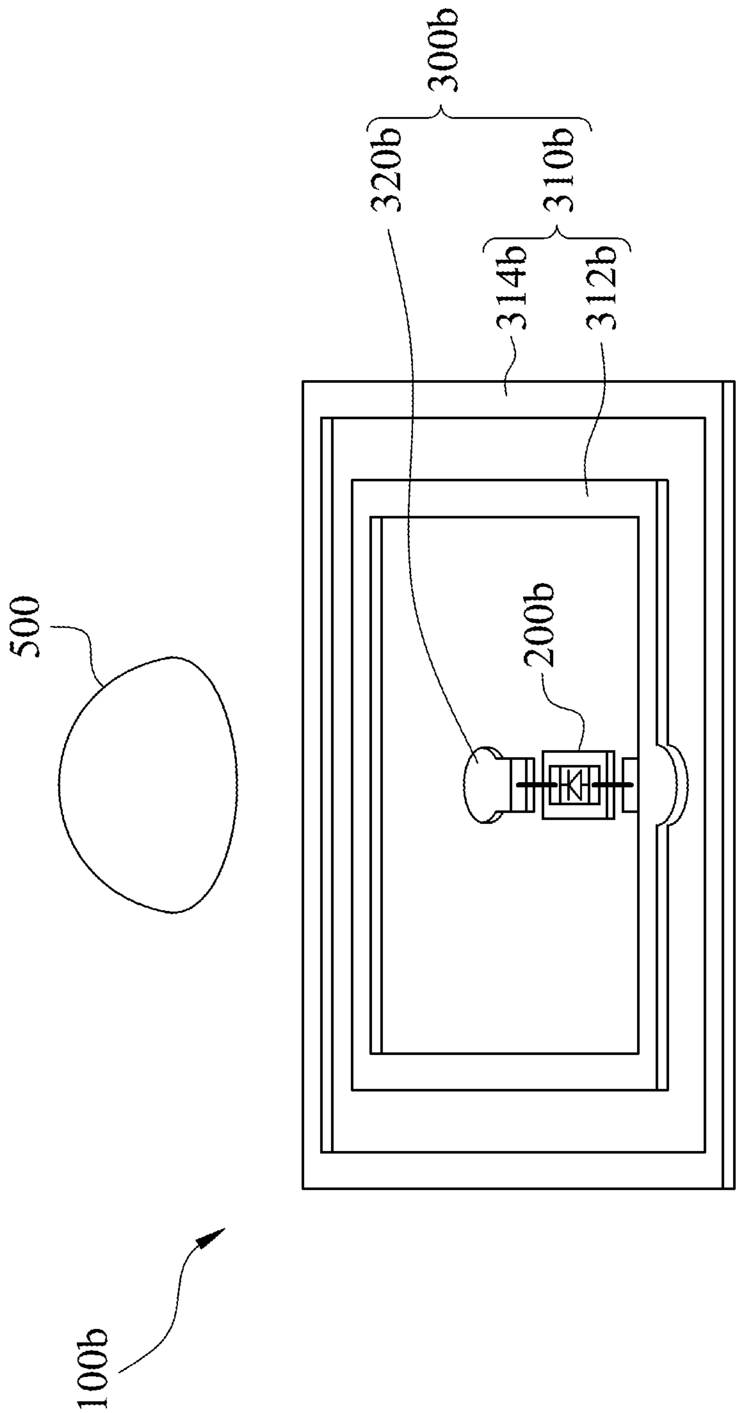
FIG. 7A shows a schematic view of a RRA structure according to a third embodiment of the present disclosure.
Figure 7B:
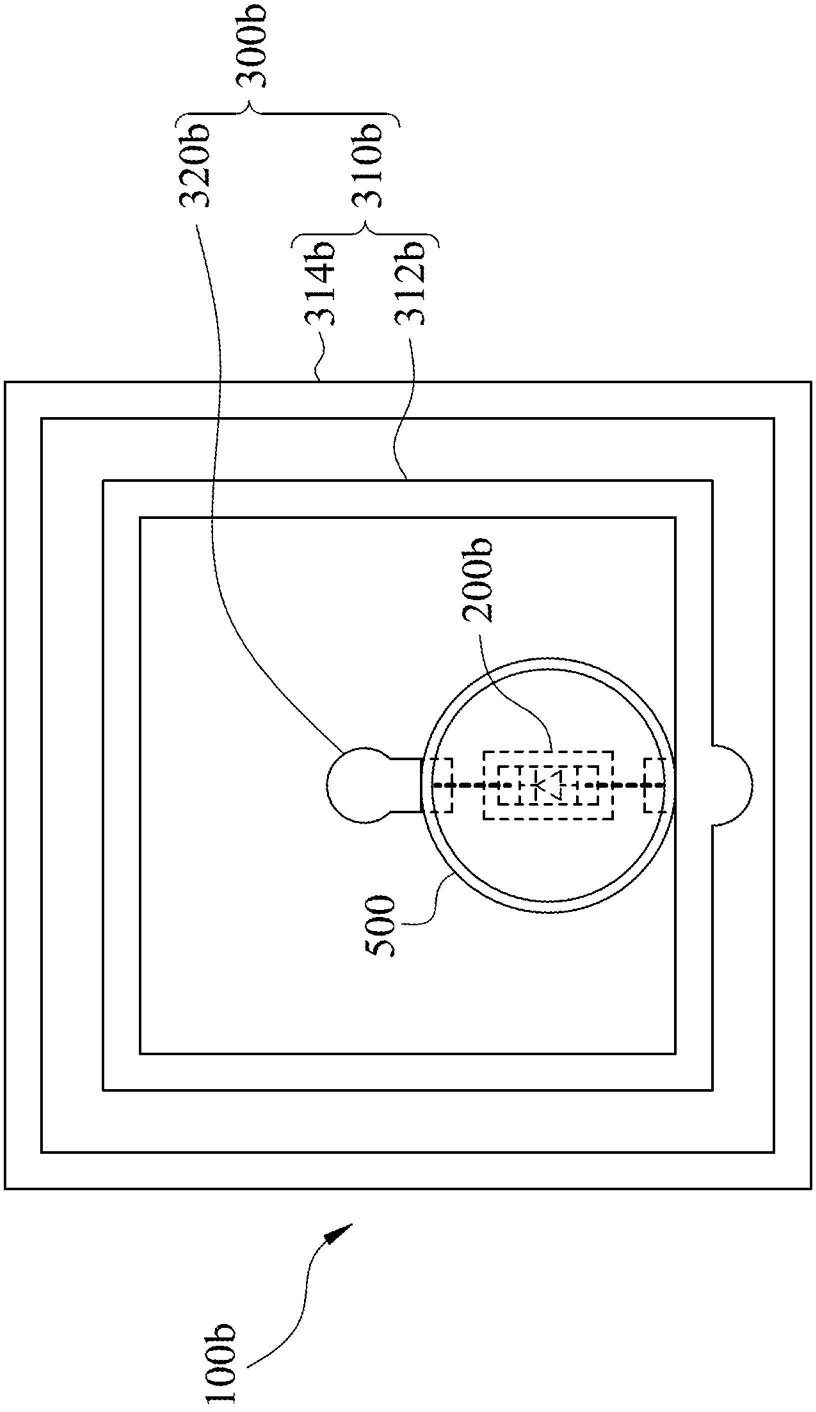
FIG. 7B shows a schematic plan view of the RRA structure of FIG. 7A.
Figure 7D:
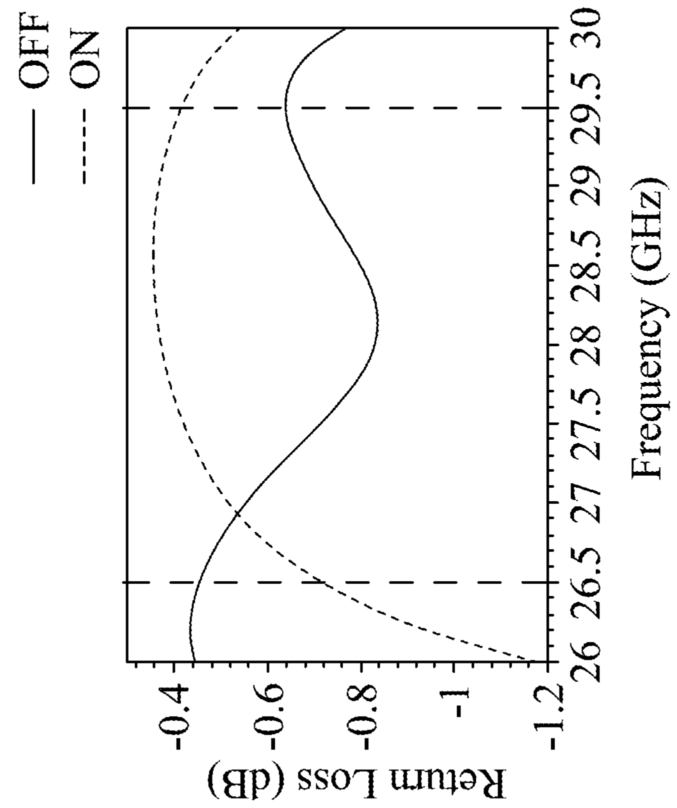
FIG. 7D shows a schematic view of a relationship between a return loss and the frequency of the RRA structure of FIG. 7A.
Figure 7C:
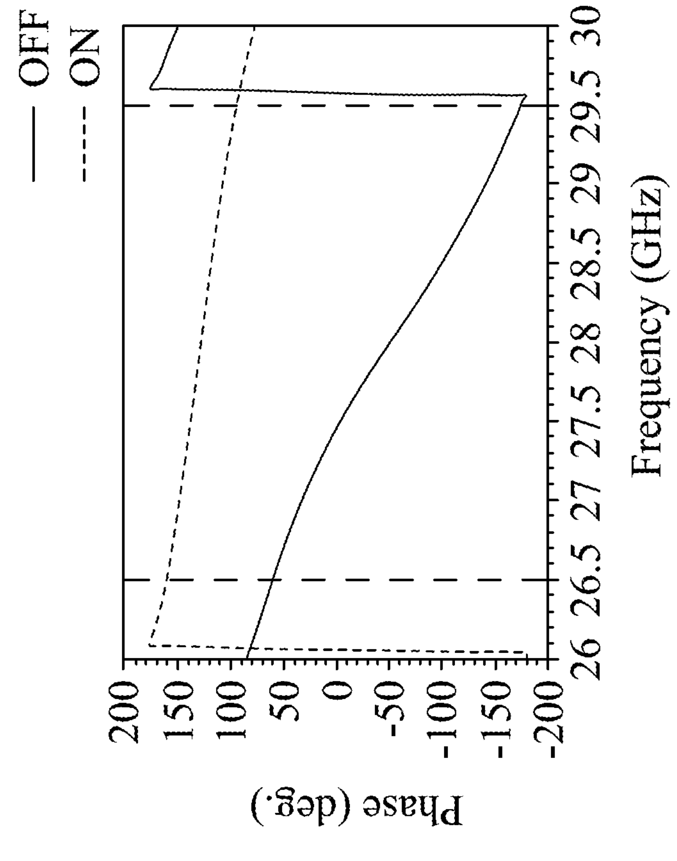
FIG. 7C shows a schematic view of a relationship between a phase and a frequency of the RRA structure of FIG. 7A.

Reference is made to FIGS. 6A, 7A, 7B, 7C and 7D. FIG. 7A shows a schematic view of a RRA structure 100*b* according to a third embodiment of the present disclosure. FIG. 7B shows a schematic plan view of the RRA structure 100*b* of FIG. 7A. FIG. 7C shows a schematic view of a relationship between a phase and a frequency of the RRA structure 100*b* of FIG. 7A. FIG. 7D shows a schematic view of a relationship between a return loss and the frequency of the RRA structure 100*b* of FIG. 7A. The RRA structure 100*b* includes a P-I-N diode 200*b*, a metal circuit 300*b* and a colloid 500. The metal circuit 300*b* includes a first metal member 310*b* and a second metal member 320*b*. The first metal member 310*b* includes a first radiating portion 312*b* and a second radiating portion 314*b*. The structure of the P-I-N diode 200*b* and the metal circuit 300*b* is the same as the structure of the P-I-N diode 200*a* and the metal circuit 300*a* of FIG. 6A, and the details will not be described here again. The colloid 500 may be black and is located above the P-I-N diode 200*b*. The colloid 500 covers the P-I-N diode 200*b* and a part of the metal circuit 300*b*, thereby protecting the P-I-N diode 200*b* and a connecting region between the P-I-N diode 200*b* and the metal circuit 300*b* (bonding wires and welding points).

Figure 8:
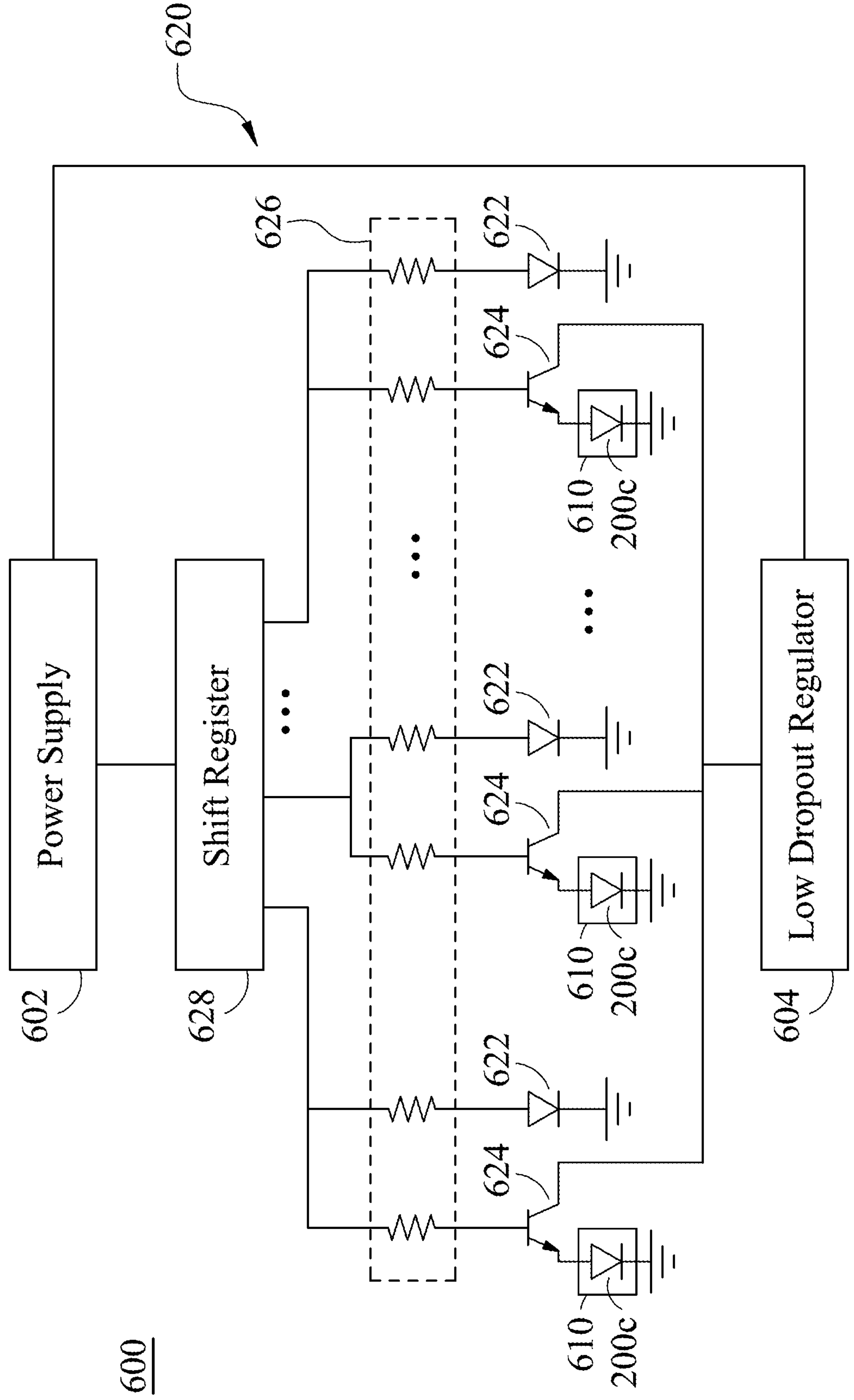
FIG. 8 shows a schematic view of a control circuit having a RRA structure according to a fourth embodiment of the present disclosure.

Reference is made to FIGS. 1, 6A, 7A and 8. FIG. 8 shows a schematic view of a control circuit 600 having a RRA structure 610 according to a fourth embodiment of the present disclosure. The control circuit 600 includes a plurality of the RRA structures 610 and a control unit 620. Each of the RRA structures 610 can be one of the aforementioned RRA structures 100, 100*a*, 100*b*. Each of the RRA structures 610 includes a P-I-N diode 200*c*, and the details will not be described here again. The control unit 620 may be configured to control the RRA structures 610.

The control unit 620 is connected to each of the RRA structures 610 and configured to control a conduction of the P-I-N diode 200*c*. In details, the control unit 620 includes a Light Emitting Diode (LED) 622, a Bipolar Junction Transistor (BJT) 624, a resistor unit 626, a shift register 628, a power supply 602 and a Low Dropout Regulator (LDO) 604. The conduction (light emission) of the LED 622 corresponds to the conduction of the P-I-N diode 200*c* of the RRA structure 610. The BJT 624 is connected to the RRA structure 610. The BJT 624 includes an emitter, a base and a collector. The emitter, the base and the collector are connected to the RRA structure 610, the resistor unit 626 and the LDO 604, respectively. A voltage of the emitter may correspond to the supply voltage Vc of FIG. 1. The resistor unit 626 is connected to the LED 622 and the BJT 624. The resistor unit 626 includes a plurality of resistors. The shift register 628 is connected to the resistor unit 626. The shift register 628 controls the conduction of the P-I-N diode 200*c* via the resistor unit 626 and the BJT 624, and the shift register 628 controls a conduction of the LED 622 via the resistor unit 626. The power supply 602 is connected to the shift register 628 and the LDO 604. The LDO 604 is connected to the BJT 624 to provide a required voltage to the BJT 624. In one embodiment, the power supply 602 can provide 5 V and 3.3 V to the shift register 628 and the LDO 604, respectively. The LDO 604 can provide 1.5 V to the BJT 624, but the present disclosure is not limited thereto. Therefore, the control circuit 600 having the RRA structure 610 of the present disclosure is integrated with easy-to-obtain components, and has characteristics of stable bias voltage, DC link detection and low power consumption.

In other embodiments, a control unit of a control circuit having a RRA structure can be implemented by a microcontroller unit (MCU) combined with a light emitting diode, a bipolar junction transistor, a resistor unit, a shift register and a power supply.

According to the aforementioned embodiments and examples, the advantages of the present disclosure are described as follows.

1. The RRA structure of the present disclosure utilizes the dumbbell shape or the double ring shape of combination of the P-I-N diode and the metal circuit to enable the RRA structure to have characteristics of broadband and wide scanning range. The RRA structure not only is a simple structure with low cost and low loss, but also significantly improves the signal quality of the millimeter-wave wireless communication network, thus being quite suitable for wireless mobile communications.

2. The control circuit having the RRA structure of the present disclosure is integrated with easy-to-obtain components, and has characteristics of stable bias voltage, DC link detection and low power consumption.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A Reconfigurable ReflectArray (RRA) structure, comprising:

a P-Intrinsic-N (P-I-N) diode; and a metal circuit, comprising:

a first metal member coupled to one end of the P-I-N diode; and a second metal member coupled to another end of the P-I-N diode;

wherein one of the first metal member and the second metal member comprises a driven first radiating portion and a driven second radiating portion, the driven first radiating portion is located between the P-I-N diode and the driven second radiating portion, the driven first radiating portion has a first length, the driven second radiating portion has a second length, and the first length is different from the second length.

2. The RRA structure of claim 1, wherein the first length is greater than the second length.

3. The RRA structure of claim 1, wherein another of the first metal member and the second metal member comprises a third radiating portion and a fourth radiating portion, the third radiating portion is located between the P-I-N diode and the fourth radiating portion, the third radiating portion has a third length, the fourth radiating portion has a fourth length, and the third length is different from the fourth length.

4. The RRA structure of claim 3, wherein the third length of the third radiating portion is equal to the first length of the driven first radiating portion, and the fourth length of the fourth radiating portion is equal to the second length of the driven second radiating portion.

5. The RRA structure of claim 4, wherein the third length is greater than the fourth length, so that the P-I-N diode is connected to the metal circuit to form a dumbbell shape.

6. The RRA structure of claim 3, wherein the fourth radiating portion has a convex portion protruding in a direction away from the P-I-N diode, and the convex portion has a semicircular shape or an arch shape.

7. A Reconfigurable ReflectArray (RRA) structure, comprising:

a P-Intrinsic-N (P-I-N) diode; and a metal circuit, comprising:

a first metal member electrically connected to one end of the P-I-N diode; and a second metal member electrically connected to another end of the P-I-N diode;

wherein one of the first metal member and the second metal member comprises a driven first radiating portion and a driven second radiating portion, the driven first radiating portion is located between the P-I-N diode and the driven second radiating portion, the driven first radiating portion has a first length and an annular shape, the driven second radiating portion has a second length, and the first length is different from the second length.

8. The RRA structure of claim 7, wherein the first length is smaller than the second length.

9. The RRA structure of claim 7, wherein the driven second radiating portion surrounds the driven first radiating portion and has another annular shape, and the driven first radiating portion is separated from the driven second radiating portion by at least one distance.

10. The RRA structure of claim 7, wherein the driven first radiating portion surrounds the P-I-N diode and another of the first metal member and the second metal member.

11. The RRA structure of claim 7, further comprising:

a colloid covering the P-I-N diode and a part of the metal circuit.

12. The RRA structure of claim 7, wherein the driven first radiating portion has a square shape, a circular shape or an elliptical shape, and the driven second radiating portion has another square shape or a curve shape.

13. A control circuit having a Reconfigurable ReflectArray (RRA) structure, comprising:

the RRA structure, comprising:

a P-Intrinsic-N (P-I-N) diode; and a metal circuit, comprising:

a first metal member coupled to one end of the P-I-N diode; and a second metal member coupled to another end of the P-I-N diode, wherein one of the first metal member and the second metal member comprises a driven first radiating portion and a driven second radiating portion, the driven first radiating portion is located between the P-I-N diode and the driven second radiating portion, the driven first radiating portion has a first length, the driven second radiating portion has a second length, and the first length is different from the second length; and a control unit connected to the RRA structure and configured to control a conduction of the P-I-N diode.

14. The control circuit having the RRA structure of claim 13, wherein the control unit comprises:

a Light Emitting Diode (LED);

a Bipolar Junction Transistor (BJT) connected to the RRA structure;

a resistor unit connected to the LED and the BJT; and a shift register connected to the resistor unit;

wherein the shift register controls the conduction of the P-I-N diode via the resistor unit and the BJT, and the shift register controls a conduction of the LED via the resistor unit.

15. The control circuit having the RRA structure of claim 13, wherein the first length is greater than the second length.

16. The control circuit having the RRA structure of claim 13, wherein another of the first metal member and the second metal member comprises a third radiating portion and a fourth radiating portion, the third radiating portion is located between the P-I-N diode and the fourth radiating portion, the third radiating portion has a third length, the fourth radiating portion has a fourth length, the third length of the third radiating portion is equal to the first length of the driven first radiating portion, the fourth length of the fourth radiating portion is equal to the second length of the driven second radiating portion, the third length is greater than the fourth length, so that the P-I-N diode is connected to the metal circuit to form a dumbbell shape.

17. The control circuit having the RRA structure of claim 13, wherein the driven second radiating portion surrounds the driven first radiating portion and has another annular shape, and the driven first radiating portion is separated from the driven second radiating portion by at least one distance.

18. The control circuit having the RRA structure of claim 13, wherein the driven first radiating portion surrounds the P-I-N diode and another of the first metal member and the second metal member.

* * * * *